(12) United States Patent
Khan et al.

(10) Patent No.: US 9,290,415 B1
(45) Date of Patent: Mar. 22, 2016

(54) FIRE RESISTANT CEMENTITIOUS COMPOSITE AND METHOD OF MAKING THE SAME

(71) Applicants: Mohammad Iqbal Khan, Riyadh (SA); Galal Fares, Riyadh (SA); Shehab Eldin Mohamed Mourad, Riyadh (SA)

(72) Inventors: Mohammad Iqbal Khan, Riyadh (SA); Galal Fares, Riyadh (SA); Shehab Eldin Mohamed Mourad, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 14/789,981

(22) Filed: Jul. 1, 2015

(51) Int. Cl.
| | |
|---|---|
| *C04B 7/26* | (2006.01) |
| *C04B 35/63* | (2006.01) |
| *C04B 35/80* | (2006.01) |
| *C04B 35/634* | (2006.01) |
| *C04B 35/622* | (2006.01) |

(52) U.S. Cl.
CPC .............. *C04B 7/26* (2013.01); *C04B 35/62204* (2013.01); *C04B 35/63488* (2013.01); *C04B 35/80* (2013.01)

(58) Field of Classification Search
CPC .......... C04B 7/26; C04B 35/63; C04B 35/80; C04B 35/62
USPC ............................................................ 524/5
See application file for complete search history.

(56) References Cited

U.S. PATENT DOCUMENTS

| | | |
|---|---|---|
| 6,204,312 B1 | 3/2001 | Taylor |
| 8,220,379 B2 | 7/2012 | Curry |
| 8,869,477 B2 | 10/2014 | Ha et al. |
| 2009/0085253 A1 | 4/2009 | Kruss |

FOREIGN PATENT DOCUMENTS

| | | |
|---|---|---|
| AU | 2005/243604 A1 | 6/2006 |
| CN | 103570309 A * | 2/2014 |

OTHER PUBLICATIONS

Miao et al. "Influences of Water-binder Ratio and Dosage of Fly Ash on Autogeneous Shrinkage of Shrinkage-Compensating Concrete", Journal of The Chinese Ceramic Society, vol. 40, No. 11, Nov. 2012, pp. 1607-1612(6) (2012).*
A. W. Dhawale and V. P. Joshi, "Engineered Cementitious Composites for Structural Applications," International Journal of Application of Innovation in Engineering & Managment (IJAIEM), p. 205, vol. 2, Issue 4, Apr. 2013.

* cited by examiner

*Primary Examiner* — Michael M Bernshteyn
(74) *Attorney, Agent, or Firm* — Richard C. Litman (57) ABSTRACT

The fire resistant cementitious composite is an engineered cementitious composite (EEC) having both flexural strength and fire resistant properties. The fire resistant cementitious composite includes a binder mixture formed from Portland cement and fly ash, sand, polyvinyl alcohol fibers, a polycarboxylic ether polymer and water. In the binder mixture, a weight ratio of the fly ash to the Portland cement is between approximately 1.0 and approximately 1.3. A weight ratio of the Portland cement to the sand is between approximately 0.85 and approximately 1.0. A weight ratio of the water to the binder mixture is between approximately 0.28 and approximately 0.33. The sand is preferably Arabian Gulf dune sand.

8 Claims, 8 Drawing Sheets

FIRE RESISTANT CEMENTITIOUS COMPOSITE AND METHOD OF MAKING THE SAME

BACKGROUND OF THE INVENTION

1. Field of the Invention

The present invention relates to engineered cementitious composites (ECCs), and particularly to a fire resistant cementitious composite including polyvinyl alcohol (PVA) fibers and dune sand.

2. Description of the Related Art

Engineered cementitious composites (ECCs), also referred to as "bendable concrete", are easily molded, mortar-based composites reinforced with specially selected short random fibers, typically in the form of polymer fibers. Unlike regular concrete, ECCs have a strain capacity in the range of 1-7%, compared to 0.1% for ordinary Portland cement (OPC). ECCs thus act more like a ductile metal than a brittle glass (as does OPC concrete), leading to a wide variety of applications.

ECCs have a variety of unique properties, including tensile properties superior to other fiber-reinforced composites, ease of processing on par with conventional cement, the use of only a small volume fraction of fibers (~2%), tight crack width, and a lack of anisotropically weak planes. These properties are due largely to the interaction between the fibers and cementing matrix, which can be custom-tailored through micromechanics design. Essentially, the fibers create many microcracks with a very specific width, rather than a few very large cracks (as in conventional concrete). This allows ECCs to deform without catastrophic failure.

Despite the desirable properties of ECCs, the fire-resistance of conventional ECCs is questionable, and particularly a matter of concern when non-metallic fibers are used in the ECC. The most common non-metallic fibers used in ECCs are polyvinyl alcohol (PVA) fibers, forming an ECC reinforced with PVA (ECC-PVA). It is well known that the melting point of PVA fibers onsets at about 200° C. and their thermal decomposition starts approximately at 239° C. At this temperature, PVA fibers in ECC-PVA are thermally decomposed and gases evolve. During these stages of thermal degradation, different types of voids and deterioration mechanisms are created which substantially affect the strain-hardening and hardened properties of the ECC-PVA. Thus, there is a need for a cost-effective method of increasing the thermal resistivity of the PVA in FCC-PVA at higher temperatures. Particularly, it would be desirable to be able to modify the structure of the PVA in the ECC-PVA to provide both flexural strength and to prevent explosive spalling at high temperatures.

Explosive spalling takes place once the accumulated vapor pressure inside the ECC-PVA reaches stresses surpassing its tensile strength. Explosive spalling relies mainly on both pore water content and tensile strength. Generally, at a temperature of 400° C., PVA fibers char and turn into a residue of carbon while the cementitious matrix itself begins thermal decomposition. It would obviously be desirable to minimize these effects at such a critical temperature, yielding not only a cost-effective ECC-PVA with flexural strength, but also being thermally resistant without explosive spalling. Thus, a fire resistant cementitious composite and method of making the same solving the aforementioned problems is desired.

SUMMARY OF THE INVENTION

The fire resistant cementitious composite is an engineered cementitious composite (EEC) having both flexural strength and fire resistant properties. The fire resistant cementitious composite includes a binder mixture formed from Portland cement and fly ash, sand, polyvinyl alcohol fibers, a polycarboxylic ether polymer and water. In the binder mixture, a weight ratio of the fly ash to the Portland cement is between approximately 1.0 and approximately 1.3, and a weight ratio of the Portland cement to the sand is between approximately 0.85 and approximately 1.0. A weight ratio of the water to the binder mixture is between approximately 0.28 and approximately 0.33. The sand is preferably Arabian Gulf dune sand, and more preferably dune sand collected from sand dunes east of Riyadh, Saudi Arabia. The median grain size of the dune sand is approximately 200 μm.

The fire resistant cementitious composite is made by first pouring the binder mixture of Portland cement and fly ash over the sand. The Portland cement, the fly ash and the sand are then mixed together to form a homogenous mixture, and the homogenous mixture is poured into a mixture of water and polycarboxylic ether polymer to form an intermediate mixture. The intermediate mixture is mixed at a first mixing speed for approximately four minutes, and then the polyvinyl alcohol fibers are slowly added thereto over a period of approximately five minutes while mixing at the first mixing speed to form a final mixture. The final mixture is then mixed for an additional period of approximately two minutes at a second mixing speed, which is greater than the first mixing speed, and the final mixture is then cast in a mold. The final mixture is then demolded and cured to produce the fire resistant cementitious composite.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The fire resistant cementitious composite is an engineered cementitious composite (EEC) having both flexural strength and fire resistant properties. The fire resistant cementitious composite includes a binder mixture formed from Portland cement and fly ash, sand, polyvinyl alcohol fibers, a polycarboxylic ether polymer and water. The Portland cement preferably conforms to the requirements of ASTM C150, with a median grain size of approximately 14 µm. The fly ash preferably has a median grain size of approximately 10 µm.

A weight ratio of the fly ash to the Portland cement in the mixture can be between approximately 1.0 and approximately 1.3. A weight ratio of the Portland cement to the sand can be between approximately 0.85 and approximately 1.0. A weight ratio of the water to the binder mixture can be between approximately 0.28 and approximately 0.33. The sand is preferably Arabian Gulf dune sand, and more preferably dune sand collected from sand dunes east of Riyadh, Saudi Arabia. The median grain size of the dune sand is approximately 200 urn, compared against a grain size of approximately 270 µm for conventional sand.

The fire resistant cementitious composite is made by first pouring the binder mixture of Portland cement and fly ash over the dune sand. Preferably, the binder mixture is homogenized prior to pouring over the dune sand. The Portland cement, the fly ash and the dune sand are then mixed together for a few minutes to form a homogenous mixture, and the homogenous mixture is poured into a mixture of water and the polycarboxylic ether polymer, in a Hobart bowl, to form an intermediate mixture. The intermediate mixture is mixed at a first mixing speed for approximately four minutes. At this point, the mixer may be stopped for approximately 30 seconds to clean the wall of the Hobart bowl by pushing down the flushed mix.

Mixing then begins again and the polyvinyl alcohol fibers are slowly added thereto over a period of approximately five minutes while mixing at the first mixing speed to form a final mixture. The polyvinyl alcohol fibers may also be manually sheared to disperse the polyvinyl alcohol fibers in the mixture as separate strands. The final mixture is then mixed for an additional period of approximately two minutes at a second mixing speed, which is greater than the first mixing speed, and the final mixture is then cast in a mold, pushing different layers over one another and finishing the surface. For purposes of testing, as will be described in detail below, standard molds of prisms and cubes were used, having dimensions of 40 mm×40 mm×160 mm, and 50 mm×50 mm×50 mm, respectively. After 24 hours, the final mixture was demolded and standard cured for seven days to produce the fire resistant cementitious composite. For purposes of testing, as will be described in greater detail below, the prism molds were divided into two groups. After seven days, the first group was tested for flexural strength, while the second group was placed in an electric furnace, where the temperature was raised from ambient temperature to 400° C. within 15 minutes, then held at 400° C. for another 15 minutes, and then lowered to less than 100° C. within 15 minutes. Further, similar samples prepared with common conventional sand (i.e., "reference sand"), rather than dune sand, were also prepared for purposes of comparison.

Figure 1:
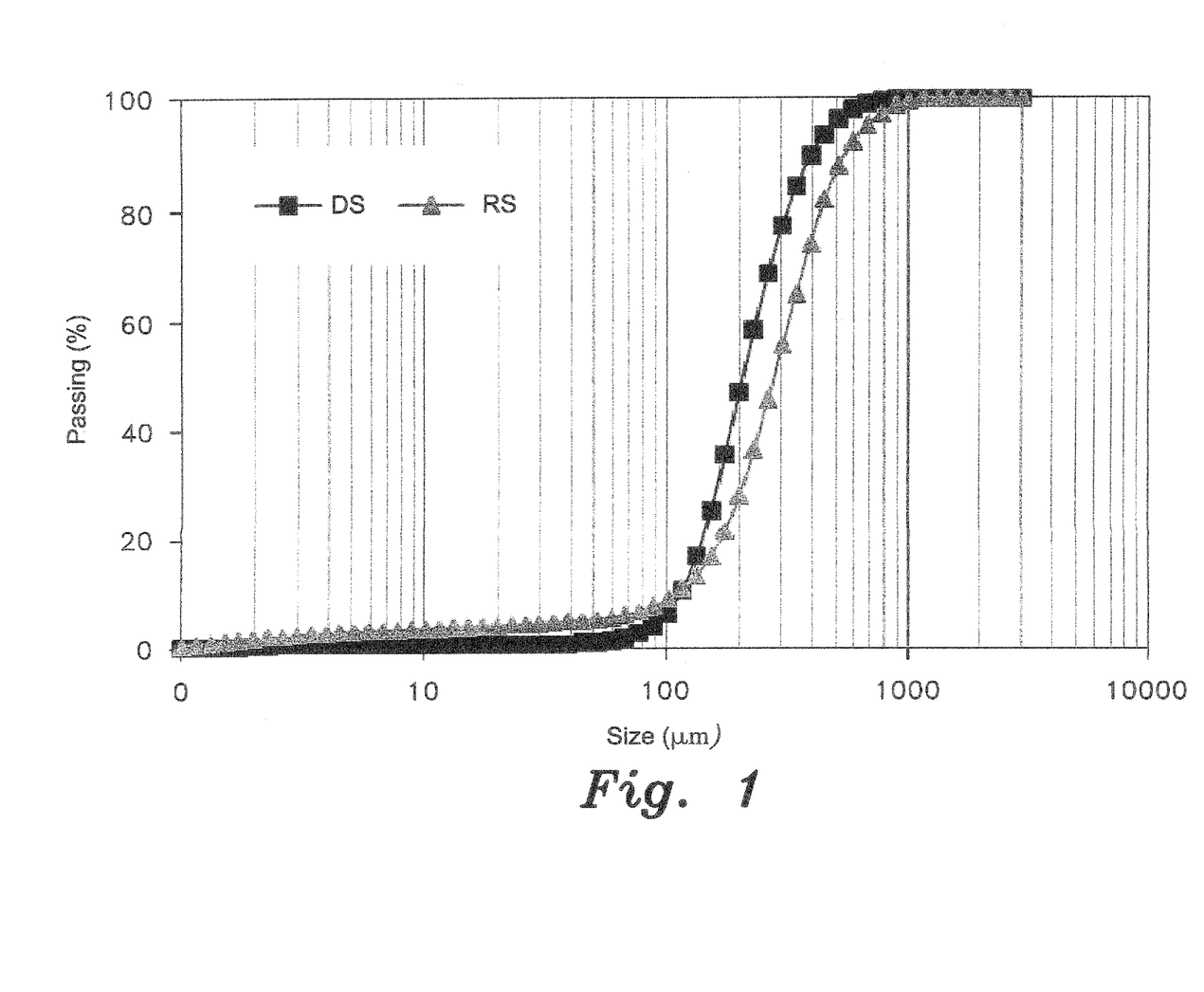
FIG. 1 is a graph comparing particle size distribution between Arabian Gulf dune sand (DS) and a conventional reference sand (RS) for use in a fire resistant cementitious composite according to the present invention.

Particle size distribution of the dune sand (DS) and the reference sand (RS) was performed by scanning electron microscopy (SEM) and FIG. 1 shows a comparison of grain size of the dune sand and the reference sand. The median grain size of the dune sand was found to be approximately 200 µm, while that of the reference sand was found to be approximately 270 µm. Both the dune sand particles and the reference sand particles were found to be spherical in form.

Figure 2:
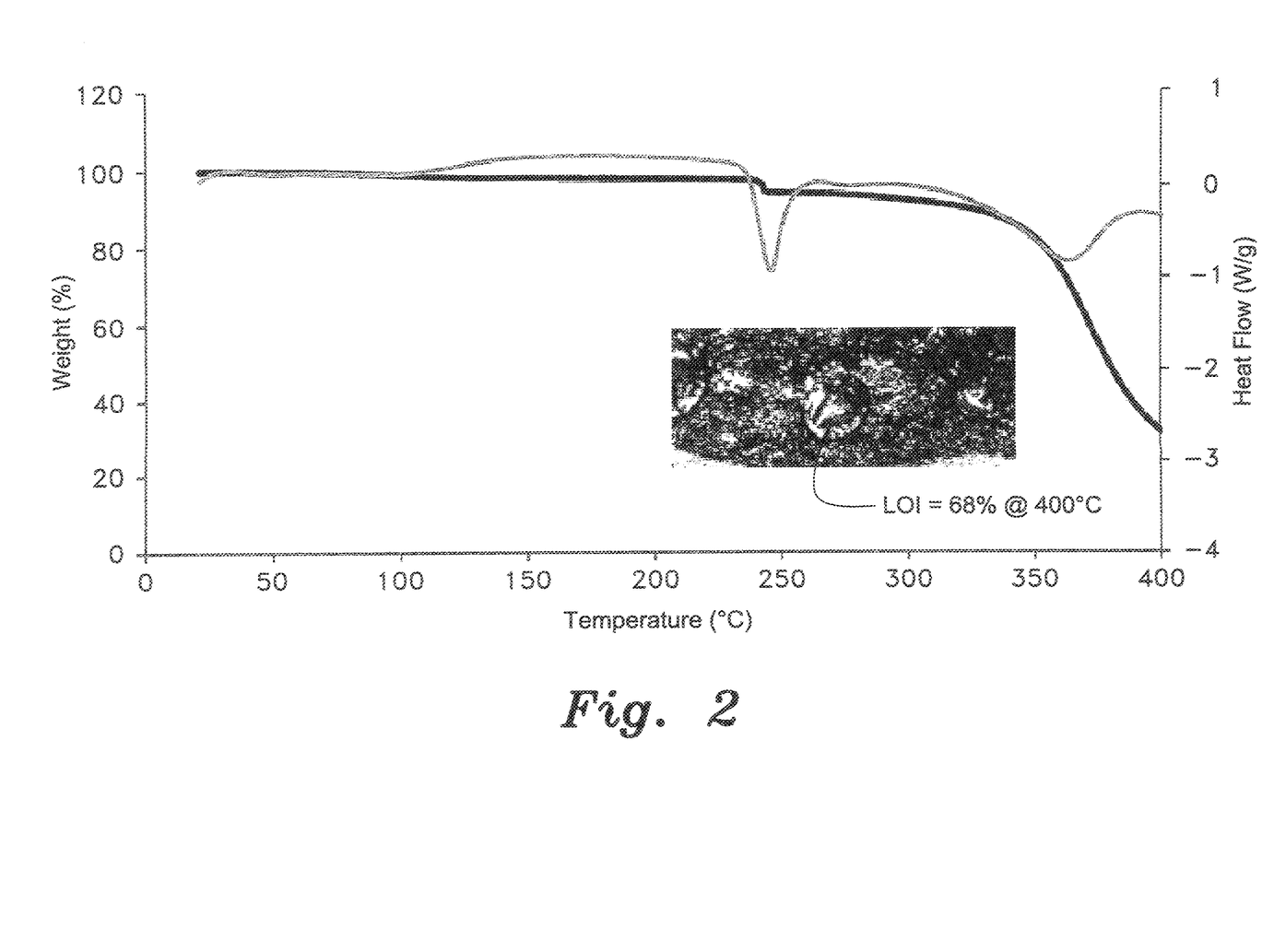
FIG. 2 is a graph showing thermogravimetric and differential scanning calorimetric analyses (TGA/DSC) on polyvinyl alcohol (PVA) fibers, at a temperature of 400° C., used in the fire resistant cementitious composite according to the present invention.

Thermogravimetric and differential scanning calorimetric analyses (TGA/DSC) techniques were used for thermal analysis of the polyvinyl alcohol (PVA) fibers. FIG. 2 shows the presence of three temperatures at which certain critical changes to the physical and chemical composition of PVA fibers take place. The total weight loss at 400° C. of PVA was over 68% of its original weight and remained charred, as demonstrated by stereomicroscopic investigation (also shown in FIG. 2).

Figure 3A:
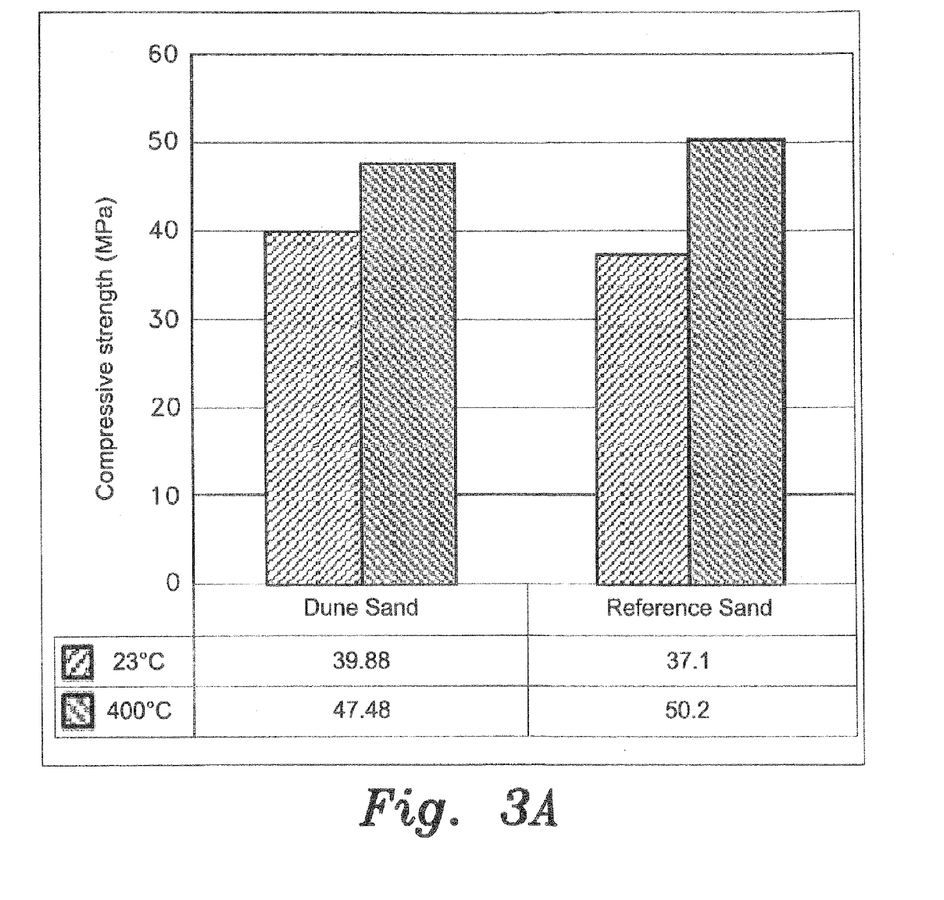
FIG. 3A is a graph comparing compressive strength of samples of the fire resistant cementitious composite, made with dune sand, against similar samples made with the reference sand, with both sets of samples being tested at temperatures of 23° C. and 400° C.
Figure 3B:
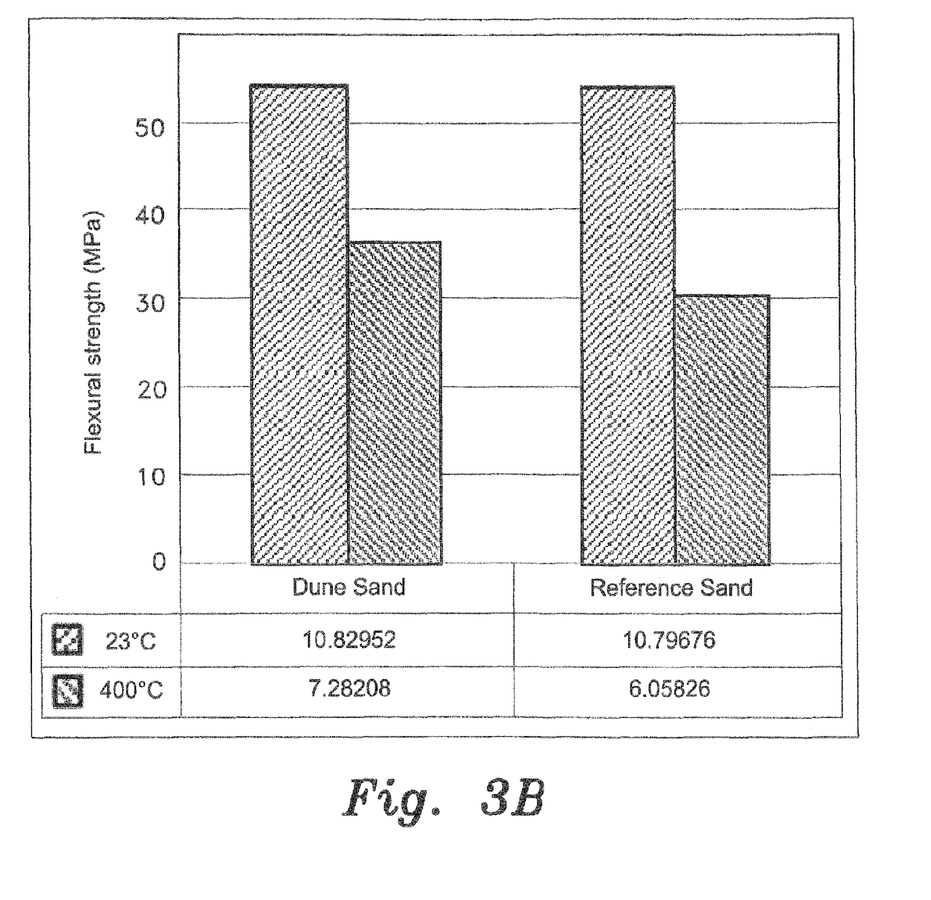
FIG. 3B is a graph comparing flexural strength of samples of the fire resistant cementitious composite, made with dune sand, against similar samples made with the reference sand, with both sets of samples being tested at temperatures of 23° C. and 400° C.

The incorporation of the PVA in the engineered cementitious composite (ECC) improves the mechanical properties thereof under both flexural and tension stresses. When PVA is subjected to thermal decomposition inside the cementitious matrix, it loses the mechanical properties under tension. The tested samples with both the dune sand and the reference sand show different behaviors at different temperatures, as shown in FIGS. 3A and 3B. The compressive strength of the dune sand samples at ambient temperature is higher than that of the reference sand samples by approximately 7%. The compressive strength of the dune sand samples at 400° C. is lower than that of the reference sand samples by approximately 5%. This may be attributed to the stimulated pozzolanic reactivity of pure silica quartz in the reference sand samples, which is higher than that of the dune sand samples. However, both the dune sand and reference sand samples have similar flexural strength at ambient temperature, while at 400° C. the flexural strength of the dune sand samples is notably higher than that of the reference sand samples by approximately 17%.

Figure 4A:
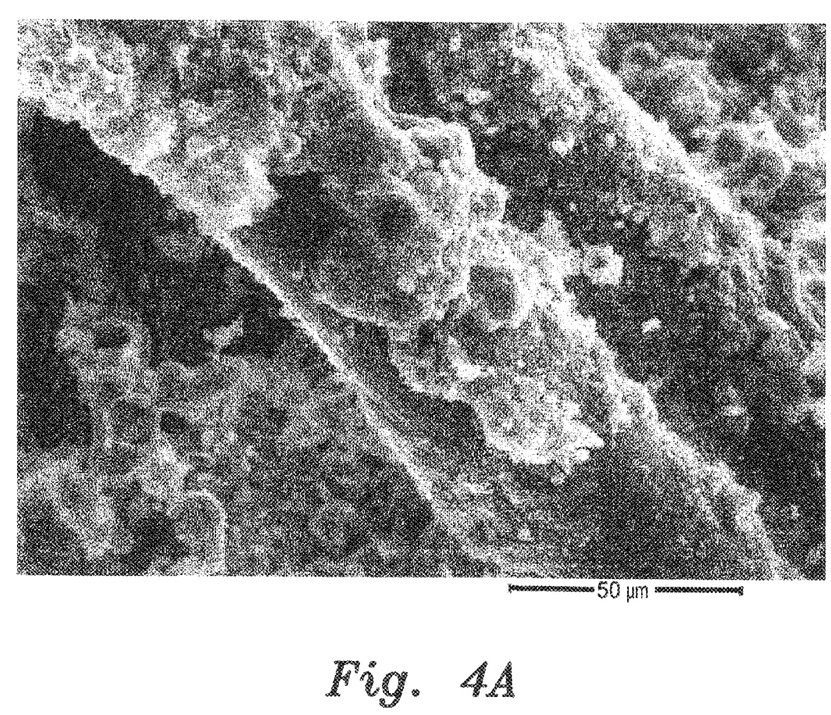
FIG. 4A is a scanning electron micrograph of a sample of the fire resistant cementitious composite, made with dune sand, cured at a temperature of 23° C.
Figure 4B:
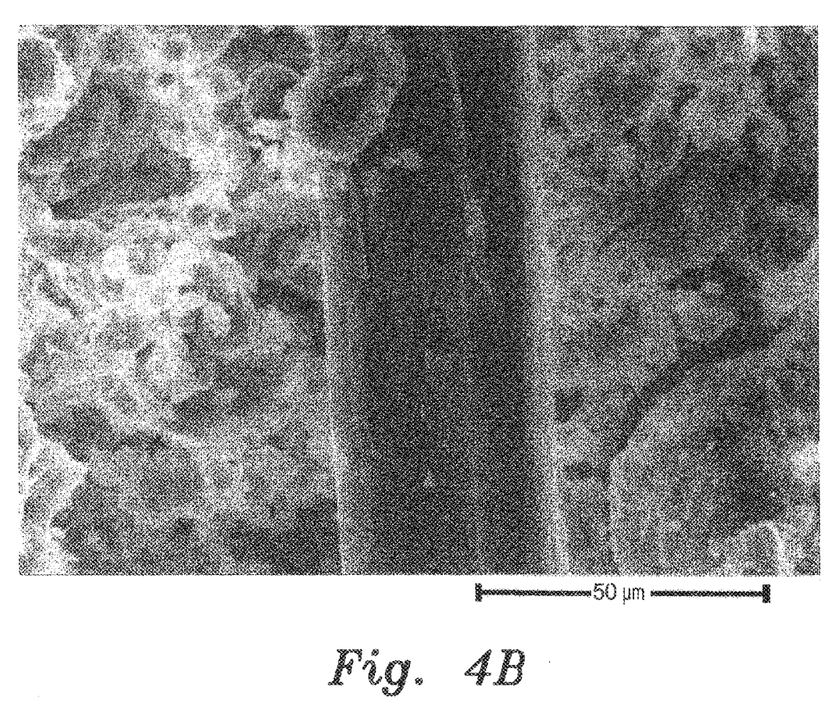
FIG. 4B is a scanning electron micrograph of a sample similar to the fire resistant cementitious composite, but made with the reference sand, cured at a temperature of 23° C.

Microstructural analysis was conducted on the samples tested at both temperatures of 23° C. and 400° C. The features of interest are the nature of bonding between PVA fibers and the cementitious matrix and the physical status of PVA under both testing conditions. The microstructures of the tested samples at ambient temperature shows that the cementitious matrix in the dune sand samples is attached to the PVA fibers better than in the reference sand samples, as shown in FIGS. 4A and 4B, respectively. The microstructure of the reference sand samples reveals that the PVA fibers are intact and free of the cementitious matrix.

Figure 5A:
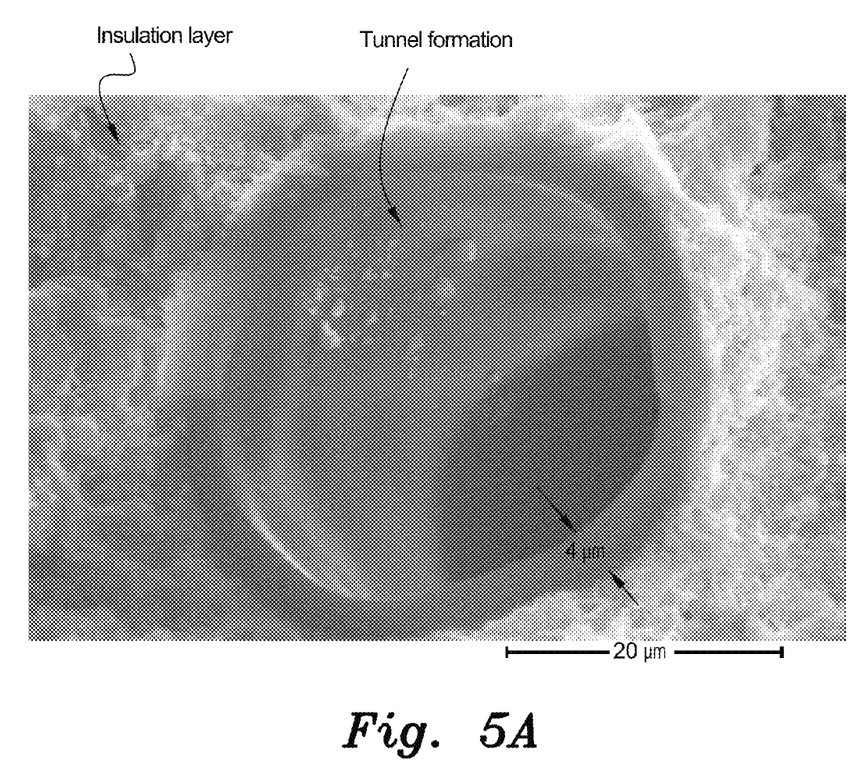
FIG. 5A is a scanning electron micrograph of a sample of the fire resistant cementitious composite, made with dune sand, cured at a temperature of 400° C.
Figure 5B:
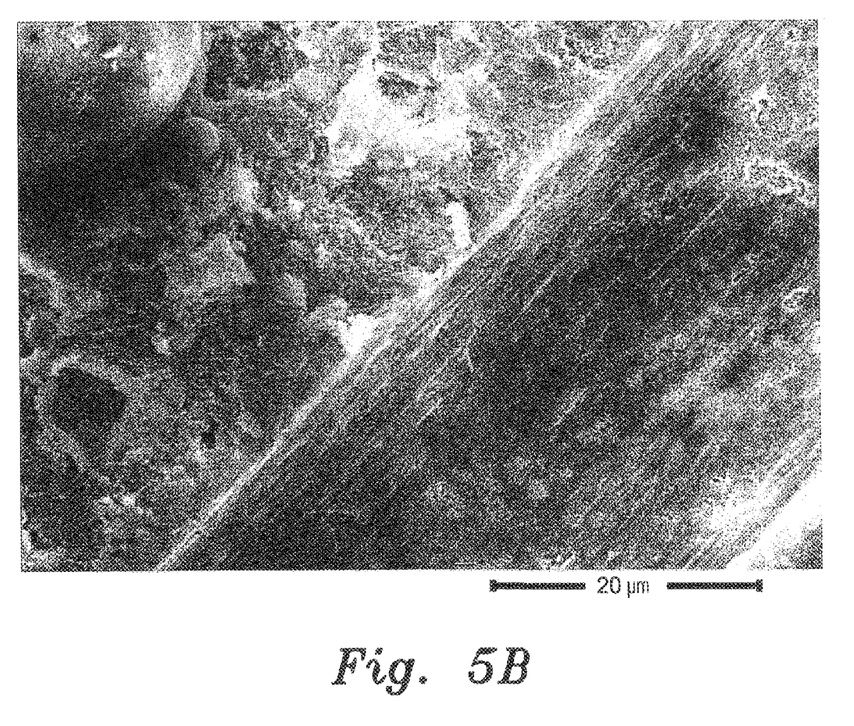
FIG. 5B is a scanning electron micrograph of a sample similar to the fire resistant cementitious composite, but made with the reference and, cured at a temperature of 400° C.

The microstructures of the dune sand and reference sand samples tested under the effect of a subjection temperature of 400° C. are shown in FIGS. 5A and 5B, respectively. The results reveal the presence of a tunneling effect, in which PVA fibers are provided in an improved and modified manner, indicating an increase in the activation energy needed to completely eliminate PVA fibers from the cementitious matrix. This is clearly different from the reference sand samples, shown in FIG. 5B, explaining the difference in flexural strength between the samples using dune sand and those using the reference sand. The improved bond interaction between the dune sand, the cementitious matrix, and the PVA fibers transforms the PVA into tubes (or "tunnels") having improved properties due to the formation of an insulating layer, which protects the PVA fibers from charring. The bond between the reference sand and the cementitious matrix and PVA fibers is weak, as it did not show a similar effect when PVA was completely removed from the system. The PVA tunnels formed in the present composite diminish the occurrence of explosive spalling, thus providing the fire resistant properties of the composite.

The presence of the dune sand clearly leads to the formation of an improved bonding between the PVA fibers and silica particles of the dune sand under the hydrothermal conditions during the firing effect. It should be noted that the quality of the insulation layer may be controlled by adjusting the proportion of the fly ash with the dune sand. The quality of the insulation layer may be further controlled by adjusting the grain sizes of the dune sand. It should be noted that this Project was funded by the National Plan for Science, Technology and Innovation (MAARIFAH), King Abdulaziz City for Science and Technology, Kingdom of Saudi Arabia, Award Number 12-ADV2591-02.

It is to be understood that the present invention is not limited to the embodiments described above, but encompasses any and all embodiments within the scope of the following claims.

We claim:

1. A fire resistant cementitious composite, comprising:
    a binder mixture comprising Portland cement and fly ash, wherein a weight ratio of the fly ash to the Portland cement in the binder mixture is between from about 1.0 to about 1.3;
    sand, wherein a weight ratio of the Portland cement to the sand is between from about 0.85 to about 1.0;
    polyvinyl alcohol fibers;
    a polycarboxylic ether polymer, and
    water, wherein a weight ratio of the water to the binder mixture is between from about 0.28 to about 0.33.

2. The fire resistant cementitious composite as recited in claim 1, wherein the Portland cement has a median grain size of about 14 μm.

3. The fire resistant cementitious composite as recited in claim 2, wherein the fly ash has a median grain size of about 10 μm.

4. The fire resistant cementitious composite as recited in claim 3, wherein the sand has a median grain size of about 200 μm.

5. A method of making a fire resistant cementitious composite, comprising the steps of:
    pouring a binder mixture comprising Portland cement and fly ash over sand, wherein a weight ratio of the fly ash to the Portland cement in the binder mixture is between from about 1.0 to about 1.3; and a weight ratio of the Portland cement to the sand is between from about 0.85 to about 1.0;
    mixing the Portland cement, the fly ash and the sand to form a homogenous mixture;
    pouring the homogenous mixture into a mixture of water and a polycarboxylic ether polymer to form an intermediate mixture, wherein a weight ratio of the water to the binder mixture is between from about 0.28 to about 0.33;
    mixing the intermediate mixture at a first mixing speed for approximately four minutes;
    adding polyvinyl alcohol fibers to the intermediate mixture over a period of approximately five minutes while mixing at the first mixing speed to form a final mixture;
    mixing the final mixture at a second mixing speed, the second mixing speed being greater than the first mixing speed;
    casting the final mixture in a mold; and
    demolding and curing the final mixture to produce a fire resistant cementitious composite.

6. The method of making a fire resistant cementitious composite as recited in claim 5, wherein the step of mixing the final mixture at the second mixing speed comprises mixing the final mixture at the second mixing speed for approximately two minutes.

7. The method of making a fire resistant cementitious composite as recited in claim 6, herein the step of demolding the final mixture is performed approximately 24 hours after the step of casting the final mixture in the mold.

8. The method of making a fire resistant cementitious composite as recited in claim 7, wherein the step of curing the final mixture comprises curing the final mixture for approximately seven days.

* * * * *